United States Patent
Hwang et al.

(10) Patent No.: US 7,589,192 B2
(45) Date of Patent: Sep. 15, 2009

(54) PH DEPENDENT ION EXCHANGE MATERIAL CAPABLE OF SELECTIVELY BINDING TO NUCLEIC ACIDS IN COMPARISON WITH PROTEINS, SOLID SUBSTRATE HAVING THE MATERIAL IMMOBILIZED ON ITS SURFACE, AND METHOD OF ISOLATING A NUCLEIC ACID USING THE MATERIAL OR THE SOLID SUBSTRATE

(75) Inventors: Kyu-youn Hwang, Incheon-si (KR); Chang-eun Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 334 days.

(21) Appl. No.: 11/437,210

(22) Filed: May 19, 2006

(65) Prior Publication Data
US 2006/0264621 A1  Nov. 23, 2006

(30) Foreign Application Priority Data
May 21, 2005 (KR) .................. 10-2005-0042781

(51) Int. Cl.
 *C07H 21/00* (2006.01)
(52) U.S. Cl. ..................................... 536/25.4
(58) Field of Classification Search ........... None
See application file for complete search history.

(56) References Cited

U.S. PATENT DOCUMENTS

| 6,310,199 | B1 | 10/2001 | Craig et al. |
| 2001/0018513 | A1 | 8/2001 | Baker |

FOREIGN PATENT DOCUMENTS

| WO | 9929703 | 6/1999 |
| WO | 0069872 | 11/2000 |

OTHER PUBLICATIONS

European Patent Office. European Search Report for EP 06008680. Dated Aug. 18, 2006.

*Primary Examiner*—Patrick T Lewis
(74) *Attorney, Agent, or Firm*—Cantor Colburn LLP

(57) ABSTRACT

Provided is a pH dependent ion exchange material. The pH dependent ion exchange material has at least one monomer selected from the group consisting of M0, M1, M2 and M3 represented by the following formulae, provided that at least one monomer having A and at least one monomer having B are contained therein, the pH dependent ion exchange material having a degree of polymerization of 2-30,000.

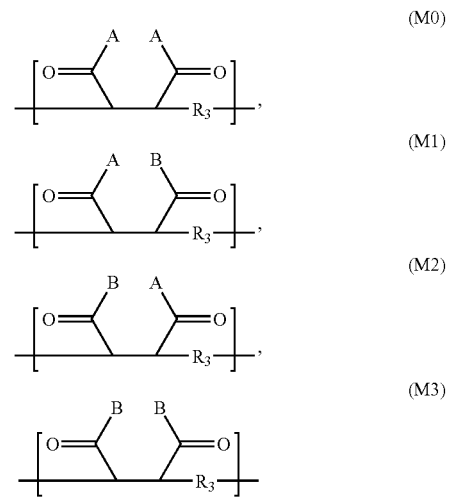

wherein

A is a group —$X(CH_2)_nY$, wherein n is an integer from 1 to 10, X is a functional group which can react with an activated ester, and Y is a primary, secondary, tertiary amine or a nitrogen-containing aromatic heterocyclic base, B is a group —$X'(CH_2)_nY'$, wherein n is an integer from 1 to 10, X' is a functional group which can react with an activated ester, and Y' is an acid generating group having a $pK_a$ value of 4 or less, and $R_3$ is an alkyl group having 1 to 10 carbon atoms.

13 Claims, 1 Drawing Sheet

PH DEPENDENT ION EXCHANGE MATERIAL CAPABLE OF SELECTIVELY BINDING TO NUCLEIC ACIDS IN COMPARISON WITH PROTEINS, SOLID SUBSTRATE HAVING THE MATERIAL IMMOBILIZED ON ITS SURFACE, AND METHOD OF ISOLATING A NUCLEIC ACID USING THE MATERIAL OR THE SOLID SUBSTRATE

CROSS-REFERENCE TO RELATED PATENT APPLICATION

This application claims the benefit of Korean Patent Application No. 10-2005-0042781, filed on May 21, 2005, in the Korean Intellectual Property Office, the disclosure of which is incorporated herein in its entirety by reference.

BACKGROUND OF THE INVENTION

1. Field of the Invention

The present invention relates to a pH dependent ion exchange material which can selectively bind to a nucleic acid, a solid substrate having the material immobilized on its surface, and a method of isolating a nucleic acid using the material or the solid substrate.

2. Description of the Related Art

Methods of isolating nucleic acids using pH dependent ion exchange matrices are known. For example, U.S. published patent application No. 2001/0018513 describes a method of isolating a nucleic acid using a material containing an ionisable group which is positively charged at a first pH such that it can be bound to the nucleic acid and releasing the nucleic acid at a second pH which is higher than the first pH. Examples of the material containing an ionisable group include N-2-acetamido-2-aminoethanesulfonic acid (ACES), N-2-acetamido-2-imidodiacetic acid (ADA), N-trihydroxymethyl-methyl-2-aminoethanesulfonic acid (TES) and trihydroxymethylaminoethane (Tris), etc. U.S. Pat. No. 6,310,199 describes a method of isolating a nucleic acid using a pH dependent ion exchange matrix comprising a silica magnetic particle and a plurality of first ion exchange ligands, each first ion exchange ligand comprising an aromatic hydrocarbon ring, a spacer covalently attached to the aromatic hydrocarbon ring, and a linker comprising a linker alkyl chain attached to the silica magnetic particle at its first end and attached to the spacer at its second end.

However, there is still a need for materials containing an ionisable group which can bind to the nucleic acids at a high speed and have a high efficiency of releasing the nucleic acids when pH is increased. In addition, the conventional materials bind not only to DNAs but also to proteins and have low selectivity to nucleic acids. Thus, the inventors of the present invention searched for materials which can bind the nucleic acids with high selectivity and have a remarkably high efficiency of releasing the nucleic acids when pH is increased, and discovered a pH dependent ion exchange material containing both an acid functional group having a $pK_a$ value of 4 or less and a base.

SUMMARY OF THE INVENTION

The present invention provides a pH dependent ion exchange material which binds to a nucleic acid more strongly than to a protein at a first pH, thereby being capable of selectively binding to the nucleic acid, and has a high efficiency of releasing the nucleic acid when pH is increased.

The present invention also provides a solid substrate having the material immobilized on its surface.

The present invention also provides a method of isolating a nucleic acid using the material or the substrate having the material immobilized on its surface.

According to an aspect of the present invention, there is provided a pH dependent ion exchange material having at least one monomer selected from the group consisting of M0, M1, M2 and M3 represented by the following formulae, provided that at least one monomer having A and at least one monomer having B are contained therein, the pH dependent ion exchange material having a degree of polymerization of 2-30,000.

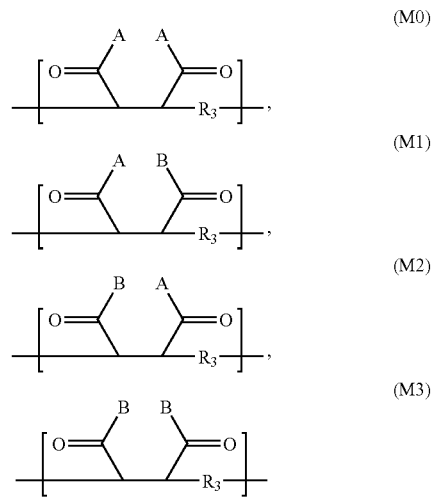

wherein

A is a group —$X(CH_2)_nY$, wherein n is an integer from 1 to 10, X is a functional group which can react with an activated ester, and Y is a primary, secondary, tertiary amine or a nitrogen-containing aromatic heterocyclic base, B is a group —$X'(CH_2)_nY'$, wherein n is an integer from 1 to 10, X' is a functional group which can react with an activated ester, and Y' is an acid generating group having a $pK_a$ value of 4 or less, and $R_3$ is an alkyl group having 1 to 10 carbon atoms.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
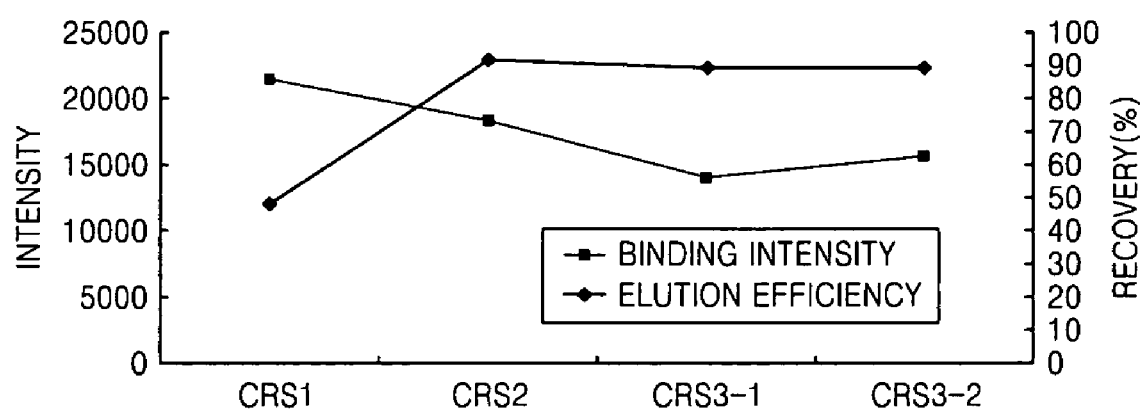
FIG. 1 is a graph illustrating fluorescent intensities determined after binding DNAs to substrates having pH dependent ion exchange materials according to an embodiment of the present invention (CRS3-1, CRS3-2) or conventional pH dependent ion exchange materials immobilized thereon (CRS1, CRS2) at pH 3 and eluting the DNAs from the pH dependent ion exchange materials at pH 7.0.

According to an embodiment of the present invention, there is provided a pH dependent ion exchange material having at least one monomer selected from the group consisting of M0, M1, M2 and M3 represented by the following formulae, provided that at least one monomer having A and at least one monomer having B are contained therein, the pH dependent ion exchange material having a degree of polymerization of 2-30,000.

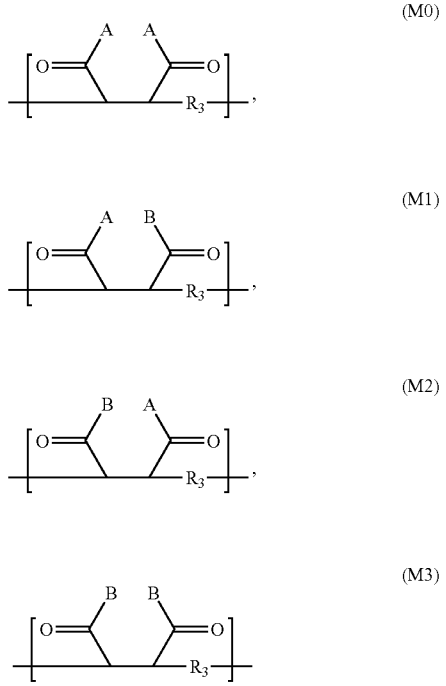

wherein

A is a group —$X(CH_2)_nY$, wherein n is an integer from 1 to 10, X is a functional group which can react with an activated ester, and Y is a primary, secondary, tertiary amine or a nitrogen-containing aromatic heterocyclic base, B is a group —$X'(CH_2)_nY'$, wherein n is an integer from 1 to 10, X' is a functional group which can react with an activated ester, and Y' is an acid generating group having a $pK_a$ value of 4 or less, and $R_3$ is an alkyl group having 1 to 10 carbon atoms.

Examples of the pH dependent ion exchange material include those in which A is a group —$X(CH_2)_nY$, wherein n is an integer from 1 to 10, X is a functional group which can react with an activated ester, and Y is a pyridinyl, pyrolyl, or imidazolyl group.

Other examples of the pH dependent ion exchange material include those in which B is a group —$X'(CH_2)_nY'$, wherein n is an integer from 1 to 10, X' is a functional group which can react with an activated ester, and Y' is a sulfonyl, sulfenyl, sulfinyl, or phosphoryl group.

In the pH dependent ion exchange material, X in A or X' in B may be —NH—, —O—, or —S—.

The pH dependent ion exchange material according to an embodiment of the present invention may be synthesized using methods which are known in the art. For example, an anhydride moiety of polyanhydride (for example, poly(ethylene-alt-maleic anhydride) (molecular weight=100,000-500,000)) is hydrolyzed to expose a carboxyl group, the exposed carboxyl group is reacted with a substance such as N-hydroxysuccinimide (NHS) and 1,3-[(dimethylamino) propyl]-3-ethylcarbodiimide (EDC) and thus, activated ester is formed. Then, a moiety A (for example, 1-(3-aminopropyl) imidazole)) or B (for example, taurine) reacted with the activated ester to produce the pH dependent ion exchange material. The polyanhydride or the moiety A (for example, 1-(3-aminopropyl)imidazole)) or B (for example, taurine) may be easily synthesized by those of ordinary skill in the art or be commercially available. A net charge of the pH dependent ion exchange material may be controlled by using a suitable ratio of A or B in the reaction.

According to another embodiment of the present invention, there is provided a solid substrate having the pH dependent ion exchange material immobilized on its surface.

The solid substrate having the material immobilized on its surface may have any form. For example, the solid substrate may have the form of plate, sphere, or microchannels, but is not limited thereto. Preferably, the solid substrate may have the form of microchannels in a microfluidic device.

A solid substrate on which the pH dependent ion exchange material to be immobilized may be selected from the group consisting of silica, fused silica, polyethylene, polypropylene, polystrene, a slide glass, and a silicon wafer, but is not limited thereto.

The solid substrate according to an embodiment of the present invention may be prepared by activating an end portion of a chain of the pH dependent ion exchange material with an activating group, such as an aldehyde group and an ester group, and coupling the activated material to a solid substrate coated with an active group such as an amino group.

The activation of the ion exchange material and the solid substrate may be carried out using any methods which are known in the art. For example, the ion exchange material may be activated by oxidation of its end group or by introducing an active group by coupling the end group to an ester compound such as an acid anhydride. In addition, the solid substrate may be activated by coating an active material such as an amino group on a surface of the solid substrate, for example, using a spin coating method. In another method of immobilizing the ion exchange material on a surface of the solid substrate, the polyanhydride as describe above (for example, poly(ethylene-alt-maleic anhydride) (molecular weight=100,000-500,000)) is coated on an activated substrate by direct interaction between amino group on substrate and carboxy anhydride group and an remained anhydride moiety of the polyanhydride is hydrolyzed to expose a carboxyl group. Then, the exposed carboxyl group is reacted with a substance such as N-hydroxysuccinimide (NHS) and 1,3-[(dimethylamino)propyl]-3-ethylcarbodiimide (EDC) and an activated ester is formed. Next, a moiety A (for example, 1-(3-aminopropyl)imidazole)) or B (for example, taurine) reacted with the activated ester to produce the solid substrate having the pH dependent ion exchange material immobilized on its surface. The polyanhydride or the moiety A (for example, 1-(3-aminopropyl)imidazole)) or B (for example, taurine) may be easily synthesized by those of ordinary skill in the art or be commercially available.

According to a still another embodiment of the present invention, there is provided a method of isolating a nucleic acid using the pH dependent ion exchange material or the solid substrate having the material immobilized on its surface, comprising: contacting a sample containing the nucleic acid with the pH dependent ion exchange material or the solid substrate at a first pH; and exposing the ion exchange material having the nucleic acid bound thereto to a solution having a second pH which is higher than the first pH, to release the nucleic acid from the ion exchange material.

The method includes contacting a sample containing the nucleic acid with the pH dependent ion exchange material or the solid substrate at a first pH. The sample may be a biological or non-biological sample containing a nucleic acid, for example, blood, cells, and PCR products. The pH dependent ion exchange material and the solid substrate having the material immobilized on its surface are described above. The first pH may be a pH at which a base portion of A in the ion exchange material is positively charged and an acid generating group of B is not charged or negatively charged. If B is negatively charged, the amount of A is much more than that of B to produce net positive charge on surface. The first pH may be 4 or less, preferably 2-2.5.

The method includes exposing the ion exchange material having the nucleic acid bound thereto to a solution having a second pH which is higher than the first pH, to release the nucleic acid from the ion exchange material. The second pH may be a pH at which a base portion of A in the ion exchange material is not charged and an acid generating group of B is negatively charged. The second pH may be 7-10. The solution used for eluting the nucleic acid from a complex of nucleic acid-pH dependent ion exchange material may be water or a suitable buffer, etc.

Hereinafter, the present invention will be described in more detail with reference to the following examples. However, these examples are given for the purpose of illustration and are not intended to limit the scope of the invention.

EXAMPLES

Example 1

Recovery of Nucleic Acids Using Substrates having pH Dependent Ion Exchange Materials Immobilized Thereon In Example 1, a pH dependent ion exchange material having at least one monomer selected from the group consisting of M0, M1, M2 and M3 represented by the following formulae, provided that at least one monomer having A and at least one monomer having B are contained therein, the pH dependent ion exchange material having a degree of polymerization of 2-30,000, was synthesized on a substrate, and then a nucleic acid was isolated using the resulting substrate:

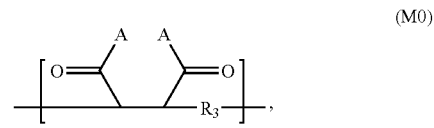

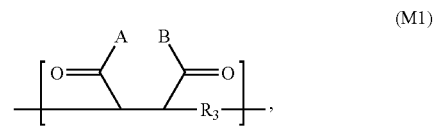

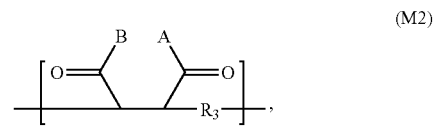

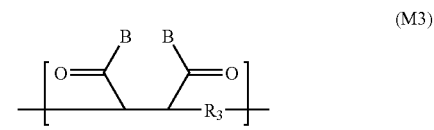

wherein
A is 1-(3-aminopropyl)imidazole,
B is taurine, and
R₃ is —CH₂CH₂—.
(1) Preparation of Substrates having the Above pH Dependent Ion Exchange Material Immobilized Thereon
A substrate having the above pH dependent ion exchange material immobilized thereon was prepared according to the following scheme:
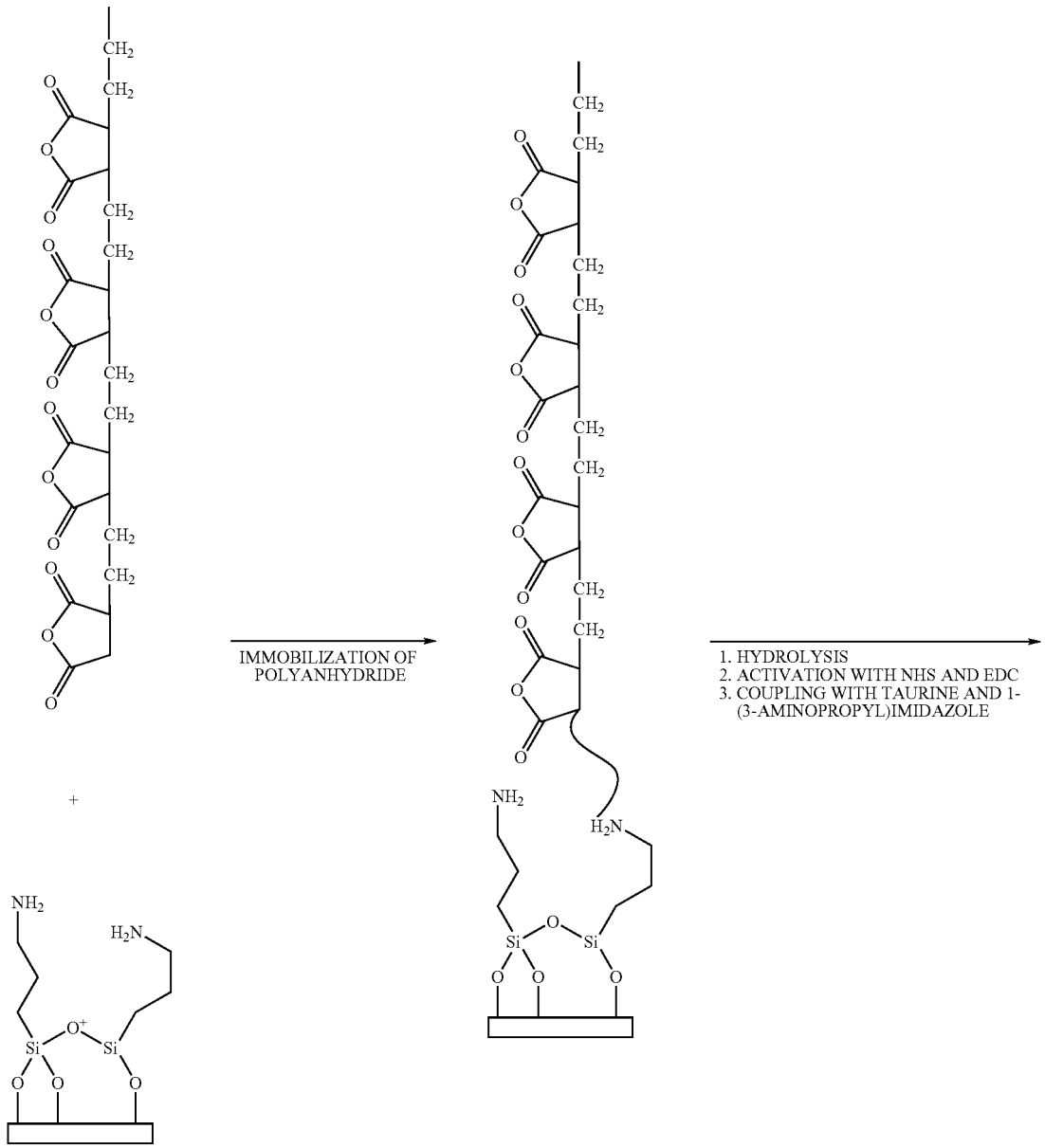

-continued

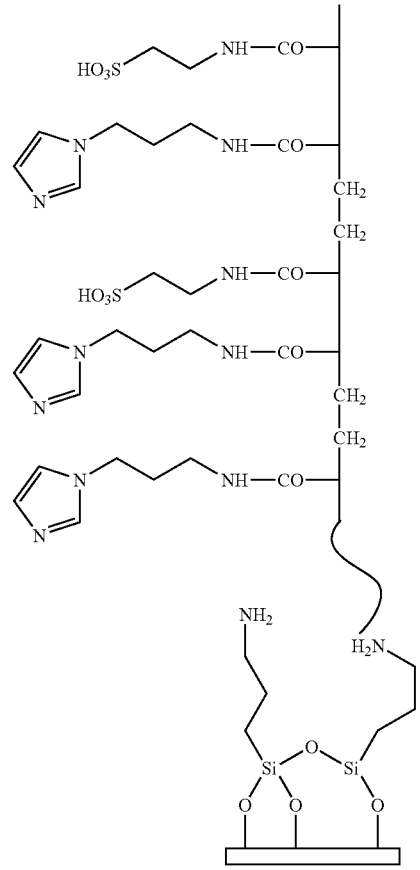

First, a glass substrate coated with an amino group (Corning GAPS glass, Corning Corporation) was immersed in 200 mM (based on a repeat unit) polyanhydride (Poly(ethylene-alt-maleic anhydride)) (molecular weight (Mw)=100,000-500,000) in N-methyl-2-pyrrolidone (NMP) at room temperature for 1 hour, and then the substrate was washed with acetone and dried in a vacuum.

The resultant glass substrate having polyanhydride bound thereto was immersed in 10 mM Boric acid buffer (pH 9.0) for 1 hour to hydrolyze the polyanhydride and then, the glass substrate was washed with water and ethanol and dried. Next, the glass substrate was immersed in a solution of a 0.15 g of N-hydroxysuccinimide (NHS), 0.19 g of 1-ethyl-3-(3-dimethylaminopropyl)-carbodiimide (EDC) and 120 μl of triethylamine (TEA) in 10 ml of NMP for 1 hour and washed with ethanol and dried to bind an activated ester moiety to the pH dependent ion exchange material. The resulting glass substrate was immersed in a solution containing 1-(3-aminopropyl)imidazole and taurine in a molar ratio of 6:4 (Experiment 1: hereinafter, referred to as "CRS3-1") or 8:2 (Experiment 2: hereinafter, referred to as "CRS3-2-")in acetonitrile as a solvent for 1 hour, and then washed with ethanol and dried.

(2) Preparation of Control Substrates

A substrate having a pH dependent ion exchange material of formula 1 immobilized thereon, wherein each of $R_1$ and $R_2$ may be identical or different and independently selected from the group consisting of a —OH group and —NH(CH$_2$)$_2$NH$_2$, m is 2, l is 1 to 30,000 (Control 1: hereinafter, referred to as "CRS1") and a substrate having a pH dependent ion exchange material of formula 1 immobilized thereon, wherein each of $R_1$ and $R_2$ may be identical or different and independently selected from the group consisting of a —OH group and an 1-(3-aminopropyl)imidazolyl group, m is 2, l is 1 to 30,000 (Control 2: hereinafter, referred to as "CRS2") were prepared. Then, DNAs were bound to these substrates at a first pH and the nucleic acids were recovered from the DNA-substrate complexes at a second pH.

(1)

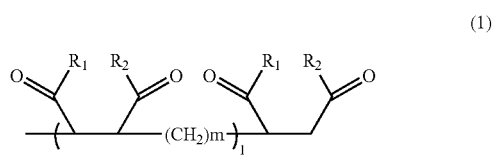

Each of Control substrates 1 and 2 were prepared as follows: First, a glass substrate coated with an amino group (Corning GAPS glass, Corning Corporation) was immersed in 200 mM (based on a repeat unit) polyanhydride (Poly (ethylene-alt-maleic anhydride)) (molecular weight=100,000-500,000) in N-methyl-2-pyrrolidone (NMP) at room temperature for 1 hour, and then the substrate was washed with acetone and dried in a vacuum. The resultant glass substrate having the polyanhydride bound thereto was immersed in a solution containing ethylene diamine: H$_2$O in a molar ratio of 4:6 (Control 1) or 1-(3-aminopropyl)imidazole: H$_2$O in a molar ratio of 4:6 (Control 2) in N,N-dimethylformamide (DMF) as a solvent for 1 hour at room temperature, and then washed with ethanol and dried. In the immersion solution, the concentration of ethylene diamine or 1-(3-aminopropyl)imidazole was 400 mM and the concentration of water was 600 mM.

DNAs having SEQ ID No. 1 labeled with Cy3 at a 5' end position were reacted with each of the substrates having the pH dependent ion exchange materials immobilized thereon as obtained above (Experiment 1 and 2 and Control 1 and 2) at pH 3. The reaction was performed by adding 60 μl of a 0.15 M sodium acetate solution (pH=3.0) containing 1 μM of the DNA to a surface of each of the substrates, covering the substrate with a cover, and placing it at room temperature for 1 hour. After the reaction, the substrates were washed with 0.15 M sodium acetate (pH 7.0). Next, their fluorescent intensities were determined using Axon scanner (GenePix company, U.S.A.) at 532 nm (PMT 350). The results are shown in FIG. 1.

FIG. 1 is a graph illustrating fluorescent intensities determined after binding DNAs to substrates having pH dependent ion exchange materials according to an embodiment of the present invention or conventional pH dependent ion exchange materials immobilized thereon at pH 3 and eluting the DNAs from the pH dependent ion exchange materials at pH 7.0.

Referring to FIG. 1, it was confirmed that when using the substrates having the pH dependent ion exchange materials according to an embodiment of the present invention immobilized thereon (CRS3-1 and CRS3-2), the DNA binding ability is slightly lower than when using the substrates having the conventional pH dependent ion exchange materials immobilized thereon (CRS1 and CRS2), but the DNA recoveries of CRS3-1 and CRS3-2 were higher than the DNA recovery of CRS1 and equivalent to the DNA recovery of CRS2.

When using the substrates CRS3-1 and CRS3-2 according to an embodiment of the present invention, a binding amount of the DNA was somewhat less than when using the conventional substrates CRS1 and CRS2. However, since the binding amount of 1.5 amol/mm$^2$ is 7500 times more than the amount of DNAs obtained from about 1,000 cells, said binding amount is sufficient to perform general biological experiments, such as PCR amplification.

Example 2

Determination of Protein Binding Ability of Substrates having pH Dependent Ion Exchange Materials Immobilized Thereon 60 μl of a 0.15 M sodium acetate solution (pH=3.0) containing 100 nM of a standard protein, IgG labeled with Alexa-532 was added to a surface of each of the substrates prepared in Example 1. Then, the substrate was covered with a cover and placed at room temperature for 1 hour. Next, the substrate was washed with 60 μl of a 0.15 M sodium acetate solution (pH=3.0) and fluorescent intensity was determined. The IgG labeled with Alexa-532 was prepared by reacting human IgG (Sigma, U.S.A.) with Alexa Fluor-532 (Molecular Probe, U.S.A) using Alexa Fluor 532 Monoclonal Ab Labeling Kit (Molecular Probe, U.S.A).

Figure 2:
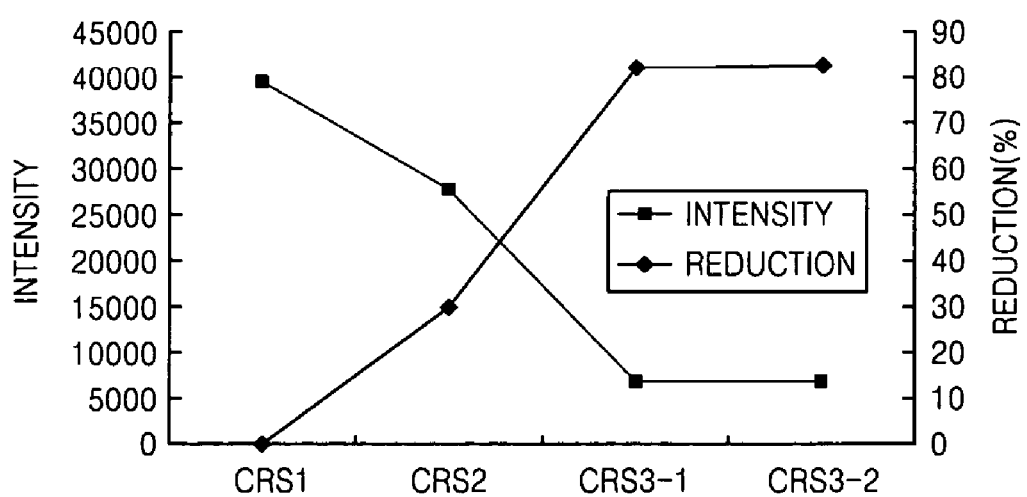
FIG. 2 is a graph illustrating fluorescent intensities determined after binding proteins to substrates having pH dependent ion exchange materials according to an embodiment of the present invention (CRS3-1, CRS3-2) or conventional pH dependent ion exchange materials immobilized thereon (CRS1, CRS2) at pH 3 and washing the substrates at pH 3.0.

FIG. 2 is a graph illustrating fluorescent intensities determined after binding proteins to substrates having pH dependent ion exchange materials according to an embodiment of the present invention or conventional pH dependent ion exchange materials immobilized thereon at pH 3 and washing the substrates at pH 3.0.

Referring to FIG. 2, it was confirmed that when using the substrates having the pH dependent ion exchange materials according to an embodiment of the present invention immobilized thereon (CRS3-1 and CRS3-2), a reduction of the protein binding ability is remarkably higher than when using the substrates having the conventional pH dependent ion exchange materials immobilized thereon (CRS1 and CRS2); CRS1 0%, CRS2 30%, CRS3-1 82%, CRS3-2 82%. It is considered that this occurs since the substrates having the pH dependent ion exchange materials according to an embodiment of the present invention immobilized thereon (CRS3-1 and CRS3-2) have more hydrophilic surfaces than the substrates having the conventional materials immobilized thereon (CRS1 and CRS2) and thus, hydrophobic reactions with the proteins were reduced.

When using the substrates CRS3-1 and CRS3-2 according to an embodiment of the present invention, both nucleic acid-binding ability and DNA-binding ability were lower than when using the conventional substrates CRS1 and CRS2. However, it was confirmed that for the substrates CRS3-1 and CRS3-2, a reduction of the protein-binding ability is remarkably higher than a reduction of the DNA-binding ability (In case of CRS3-1, a reduction of the DNA-binding ability was 25% and a reduction of the protein-binding ability was 82%).

A pH dependent ion exchange material and a solid substrate having the material immobilized thereon according to the present invention weakly bind to proteins, but strongly bind to nucleic acids. Thus, they are useful for selectively isolating the nucleic acids.

By using a method of isolating a nucleic acid according to the present invention, the nucleic acid can be isolated with high selectivity and recovery.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pH dependent ion exchange material having at least one monomer selected from the group consisting of M0, M1, M2 and M3 represented by the following formulae, provided that at least one monomer having A and at least one monomer having B are contained therein, the pH dependent ion exchange material having a degree of polymerization of 2-30,000,

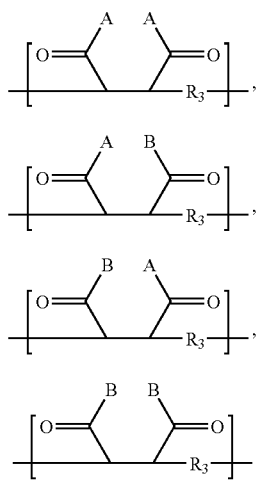

wherein
A is a group —X(CH$_2$)$_n$Y, wherein n is an integer from 1 to 10, X is a functional group which reacts with an activated ester, and Y is a primary, secondary, tertiary amine or a nitrogen-containing aromatic heterocyclic base,
B is a group —X'(CH$_2$)$_n$Y', wherein n is an integer from 1 to 10, X' is a functional group which reacts with an activated ester, and Y' is an acid generating group having a pK$_a$ value of 4 or less, and
R$_3$ is an alkyl group having 1 to 10 carbon atoms.

2. The pH dependent ion exchange material of claim 1, wherein A is a group —X(CH$_2$)$_n$Y, wherein n is an integer from 1 to 10, X is a functional group which can react with an activated ester, and Y is a pyridinyl, pyrolyl, or imidazolyl group.

3. The pH dependent ion exchange material of claim 1, wherein B is a group —X'(CH$_2$)$_n$Y', wherein n is an integer from 1 to 10, X' is a functional group which can react with an activated ester, and Y' is a sulfonyl, sulfenyl, sulfinyl, or phosphoryl group.

4. The pH dependent ion exchange material of claim 2, wherein X or X' is —NH—, —O—, or —S—.

5. A solid substrate having the pH dependent ion exchange material of claim 1 immobilized on its surface.

6. The solid substrate of claim 5, having the form of microchannels in a microfluidic device.

7. The solid substrate of claim 6, wherein a solid substrate on which the ion exchange material to be immobilized is selected from the group consisting of silica, fused silica, polyethylene, polypropylene, polystyrene, a slide glass, and a silicon wafer.

8. A method of isolating a nucleic acid using the pH dependent ion exchange material of claim 1, comprising:
  contacting a sample containing the nucleic acid with the ion exchange material at a first pH; and
  exposing the ion exchange material having the nucleic acid bound thereto to a solution having a second pH which is higher than the first pH, to release the nucleic acid from the ion exchange material.

9. The method of claim 8, wherein the first pH is 2-3.5 and the second pH is 7-10.

10. A method of isolating a nucleic acid using the solid substrate of claim 5, comprising:
  contacting a sample containing the nucleic acid with the solid substrate at a first pH; and
  exposing the ion exchange material having the nucleic acid bound thereto to a solution having a second pH which is higher than the first pH, to release the nucleic acid from the ion exchange material.

11. The method of claim 10, wherein the first pH is 2-3.5 and the second pH is 7-10.

12. The method of claim 10, the solid substrate has the form of microchannels in a microfluidic device.

13. The method of claim 10, wherein a solid substrate on which the ion exchange material to be immobilized is selected from the group consisting of silica, fused silica, polyethylene, polypropylene, polystyrene, a slide glass, and a silicon wafer.

* * * * *

SEQUENCE LISTING

<160> NUMBER OF SEQ ID NOS: 1

<210> SEQ ID NO 1
<211> LENGTH: 50
<212> TYPE: DNA
<213> ORGANISM: Artificial Sequence
<220> FEATURE:
<223> OTHER INFORMATION: reference DNA

<400> SEQUENCE: 1
ggcctcactt cctggggtca tgaccccagg cctggaggcc tgcttccctt    50